United States Patent Office 3,234,154
Patented Feb. 8, 1966

3,234,154
CEMENT COMPOSITION
Robert C. Martin, Tulsa, Okla., assignor to The Dow Chemical Company, Midland, Mich., a corporation of Delaware
No Drawing. Filed Dec. 12, 1960, Ser. No. 75,104
7 Claims. (Cl. 260—17.5)

This invention relates to a hydraulic cement composition and a method of its use. More particularly, it pertains to a cement composition and method especially adaptable to the cementing of wells penetrating subterranean formations.

Hydraulic cement compositions are usually employed by making an aqueous slurry of the cement and confining the slurry to the zone or place to be cemented until the cement has set or hardened into a monolithic solid. Among the extensive uses of hydraulic cement compositions is cementing wells, e.g., cementing casings in place and cementing off zones producing undesirable fluids such as a water-producing stratum in an oil or gas well. When the cement is used for this purpose, it is essential that the cement have certain properties which may be only desirable for other application. Slurries of water and hydraulic cement in contact with a coarse medium, such as certain subterranean formations encountered during cementing operations in wells, tend to lose part of their water content into the coarse medium. As a result the slurry may lose its fluidity and cease to flow under the placement pressures available through narrow passages. Bridging may occur resulting in failure to seal off sections of the formation. Another desirable characteristic is to have a cement with a sufficiently slow setting time so that sufficient time is available in which the cement may be intermixed with water to form a slurry and pumped into the subterranean formation before the cement begins to set. The cement thickens just prior to setting which is a disadvantage. However in addition to the disadvantage of increased viscosity, the movement of the cement during this time greatly impairs the ultimate strength of the cement.

To improve the properties of the hydraulic cement, numerous additaments are added. Among these are additaments to reduce the fluid loss and to retard the setting time of the cement. Due to the numerous chemical reactions occuring upon hydration and setting of hydraulic cement compositions, an additament which is compatible and imparts only the desirable property without adversely effecting other characteristics of the cement is seldom found. For example, an additament for fluid loss may function satisfactorily when used in the cement alone but becomes totally ineffective when a retardant is added.

A known fluid loss additament particularly effective in hydraulic cement is a high molecular weight water-soluble polymer such as a sulfonated polystyrene or sulfonated polyvinyltoluene polymer in either its acid or water-soluble salt form. While these resins are very desirable, they lose their effectiveness as fluid loss agents when a glucoheptonic acid or a water-soluble salt of glucoheptonic acid is used as a retardant. The glucoheptonic acid additament is a very effective setting retardant. It is thus very desirable to obtain a cement composition containing the glucoheptonic acid retarding agent in which the sulfonated polymer is also an effective fluid loss additive.

It is therefore an object of this invention to provide a hydraulic cement composition wherein a sulfonated polystyrene or a sulfonated polyvinyltoluene polymer, a glucoheptonic acid or its salt, and a stabilizer are used as effective additaments to reduce the fluid loss and the setting time of the cement. Another object is to provide a process wherein the cement is used in wells penetrating subterranean formation. A still further object is to provide a process for stabilizing a sulfonated polystyrene or a sulfonated polyvinyltoluene polymer, in the presence of glucoheptonic acid or its salt, in a hydraulic cement composition wherein the adverse effect of the glucoheptonic acid or its salt on the sulfonated polymer as a fluid loss agent is reduced.

The above and other objects are obtained according to the invention by intermixing in the hydraulic cement containing a sulfonated polystyrene or a sulfonated polyvinyltoluene polymer and glucoheptonic acid or its salt from .003 to 5.0 weight percent, based upon the dry cement, of an amine derivative of refined lignin. The addition of the amine derivative of lignin stabilizes the sulfonated polyvinylstyrene or polyvinyltoluene polymer so that the addition of the retarding agent does not decrease the effectiveness of the fluid loss additament.

In addition to the stabilization of the fluid loss additament, the ultimate strength of the hydraulic cement is increased by using the three constituents.

The fluid loss additament is a high molecular weight polymer of sulfonated polystyrene or sulfonated vinylpolytoluene, which is generally added in an amount of from 0.2 to 4.0 weight percent of the dry hydraulic cement, preferably from 0.7 to 1.6 weight percent of the cement. Polymers having a molecular weight of 100,000 and above are most commonly used. Polymers having a molecular weight in the range of 300,000 to 4 million are preferred. Generally the solubility of the polymer decreases with increased molecular weight so that polymers having a molecular weight of over 8 million are seldom used. The viscosities of the polymers are determined on the basis of known correlations between the molecular weight and the Oswald viscosity of a 10 weight percent solution of the polymer in toluene at 25° C.

The glucoheptonic acid retardant is generally employed in an amount of 0.025 to 1 weight percent based upon the weight of the dry hydraulic cement. The retardant may be the glucoheptonic acid itself or the water-soluble salt thereof. These salts may be generally obtained by the reaction of the acid with an alkaline salt or an hydroxide. Generally when the acid is added to the cement a certain amount of salts are formed by the acid being neutralized by some of the constituents in the cement. Both the alpha and the beta form of the acids may be used. The sodium salt of the acid is generally preferred.

The stabilizer or lignin additament is an amine derivative of lignin. One of the most convenient and available sources of lignin is the paper and pulp industry. In pulping of woods, such as pine wood, the lignin is subjected to alkaline hydrolysis by sodium hydroxide and sodium sulfide. As a result of the hydrolysis some thio groups are introduced into the lignin molecule in addition to the formation of a sodium salt of the lignin. The treated lignin thus obtained may be further treated to introduce an alkyl amine group into the molecule through a methylene linkage. The amine groups are the lower alkyl amines having alkyl radicals of up to 4 carbon atoms and may be primary, secondary or tertiary amines. It is believed that the presence of an amine group in the lignin molecules is essential to obtain the desired result. The product may also contain sodium or other metal substituents. For example, a preferred amine derivative of lignin is under the tradename Indulin XW–1. The product contains approximately 2 amine groups per 1000 molecular weight and also contains about 2 sodium atoms per 1000 molecular weight which are reacted with phenolic groups located elsewhere in the structure.

The amount of the lignin amine derivative used will vary somewhat with the amount of retardant and the amount of fluid loss agent added. However, generally the most effective results are obtained with from 0.0125 to .5 weight percent of the lignin derivative, based upon the dry cement, although the amount used may vary from 0.003 to 5 percent.

In incorporating the lignin stabilizer in the cement no special procedure has to be followed. The various known and accepted methods of preparing hydraulic cements by intermixing the cement with water may be used. For example any of the well known cement mixers may be used. The fluid loss agent, the retardant, and the lignin derivative may be intermixed with the dry hydraulic cement prior to the addition of the water or the additaments may be added to the cement at the same time with the water or as a mixture in the water.

While the lignin amine derivative may be used to stabilize the particular sulfonated polymer fluid loss agent in the presence of a glucoheptonic acid type retardant in any hydraulic cement where they are used as agents, the derivative is especially effective when it is used in combination with the other additaments in cements used in the cementing of wells as designated as classes A, B, C, D, E, F and N by The American Petroleum Institute. Description of the cements may be found in the American Petroleum Institute publication R.P. 10–B Ninth Edition, January 1960, entitled, "Recommended Practice for Testing Oil-Wells Cements and Additives."

To illustrate the stabilization effect of the lignin amine derivative on the sulfonated polymer fluid loss agent in the presence of the glucoheptonic acid type retardant, a series of runs was made where the fluid loss, setting time, and the ultimate strength of the cement were measured using various combinations and concentrations of the respective additaments. Standard procedures for testing oil well cement as given in the American Petroleum Institute R.P. 10–B publication cited above were used. In making the tests approximately 800 grams of the hydraulic cement were slurried with approximately 320 grams of water to give a cement slurry. Various amounts of additaments were added to the cement, the concentrations of which are expressed as weight percent of the dry cement.

In determining the fluid loss, the cement slurry was run in a Halliburton thickening tester described in the above cited API publication, Section VIII, entitled, "Atmospheric Pressure Thickening Tests–A." The schedule 8, a 14,000 foot casing-cementing well-simulating test was partially followed. The Halliburton thickening time tester was operated at atmospheric pressure. The slurry was stirred employing the temperature and time given in schedule 8 until a temperature of 200° F. had been reached after 80 minutes. This temperature was then maintained with continued stirring for an additional 30 minutes after which time the fluid loss of the cement slurry was determined. The procedure followed in determining the fluid loss was as specified under Section VI entitled, "Filter-Loss Test," given in the above-cited publication using a high pressure filter press. The filter medium was a 325 mesh U.S. Standard Sieve Series screen supported by a 14 mesh Sieve Series screen. The tests were made at 1000 pounds p.s.i. and 200° F.

The thickening tests were made using the Pan American Petroleum Corporation pressure-temperature thickening-time tester and Schedule 19, the 14,000 foot squeeze-cementing well-simulation test described in the above publication under Section VIII was used.

The compressive strength tests were determined by the procedure described in the above publication under Section VI entitled, "Strength Test," Schedule 7S, a 12,000 foot depth well test was used employing a bottom hole circulating temperature of 260° F. The results obtained in the numerous runs made are given in the table below.

The lignin amine derivative used in the test was a high molecular weight amine derivative product containing approximately 2 amine groups and 2 sodium atoms per 1000 molecular weight, sold under the tradename of Indulin XW–1.

The polyvinyltoluene polymer had a molecular weight of about 300,000 determined from the viscosity of a toluene solution of the polymer according to the well known and accepted methods.

| Test | Sodium Salt of Sulfonated Polyvinyl Toluene Polymer, Percent wt. of Dry Cement | Sodium Glucoheptonate, Percent Wt. of Dry Cement | Lignin Amine Derivative, Percent wt. of Dry Cement | Cement, API Designation | Fluid Loss (ml. in 30 min.) | Thickening Time (hrs.: min.) | 24 Hour Comprs'sive Strength, p.s.i. |
|---|---|---|---|---|---|---|---|
| Blank | | | | Class E | >500 | 0:40 | 6,509 |
| Do | 1.5 | | | do | 45 | 1:45 | 4,212 |
| Do | | 0.1 | | do | >500 | 2:28 | 8,900 |
| Do | | | 0.5 | do | >500 | 0:55 | |
| Do | 1.5 | 0.1 | | do | 230 | | |
| Do | 1.5 | | 0.5 | do | | 0:32 | |
| 1 | 1.5 | 0.1 | 0.0125 | do | 99 | | |
| 2 | 1.5 | 0.1 | 0.05 | do | 40 | | |
| 3 | 1.5 | 0.1 | 0.1 | do | 36 | 2:39 | 9,034 |
| 4 | 1.5 | 0.1 | 0.25 | do | 31 | | |
| 5 | 1.5 | 0.1 | 0.5 | do | 27 | 2:16 | |
| 6 | 1.5 | 0.2 | 0.05 | do | 30 | | |
| 7 | 1.5 | 0.2 | 0.1 | do | 42 | 2:50 | |
| 8 | 1.5 | 0.2 | 0.2 | do | 28 | >4:00 | 8,249 |
| 9 | 1.5 | 0.2 | 0.3 | do | 28 | 4:00 | |
| 10 | 1.5 | 0.2 | 0.5 | do | 27 | 4:00 | |
| 11 | 1.5 | 0.4 | 0.05 | do | 49 | >4:00 | |
| Blank | | | | Class A | >500 | 0:34 | |
| Do | 1.5 | | | do | 55 | 0:45 | |
| Do | | 0.1 | | do | >500 | >4:00 | |
| Do | | | 0.1 | do | >500 | 0:40 | |
| Do | 1.5 | 0.1 | | do | 250 | >4:00 | |
| 12 | 1.5 | 0.1 | 0.1 | do | 46 | >4:00 | |

What is claimed is:

1. A hydraulic cement composition comprising a hydraulic cement; a fluid-loss additament selected from the group consisting of water-soluble sulfonated polystyrene and sulfonated polyvinyltoluene polymers; a setting retardant selected from the group consisting of glucoheptonic acids, water-soluble salts thereof and mixtures of said acids and salts; and from .003 to 5.0 parts by weight per 100 parts by weight of dry hydraulic cement of a lignin amine having at least one lower alkyl amine group per thousand molecular weight.

2. A hydraulic cement composition comprising 100 parts by weight of a hydraulic cement; from 0.2 to 4 parts by weight of a water-soluble polymer selected from the group consisting of sulfonated polystyrene and sulfonated polyvinyltoluene; .025 to 1.0 parts by weight of a setting retardant selected from the group consisting of glucoheptonic acids, water-soluble salts thereof and mixtures of said acids and salts; and .003 to 5.0 parts by weight of a lignin amine having at least one lower alkyl amine group per thousand molecular weight.

3. A hydraulic cement according to claim 2 wherein the polymer is a sulfonated polyvinyltoluene and the setting retardant is sodium glucoheptonate.

4. A hydraulic cement according to claim 3 wherein the lignin amine has from 2 to 4 alkyl amine groups having alkyl radical containing up to 4 carbon atoms per 1000 molecular weight of the lignin amine and is present in an amount of from 0.05 to 1.0 part by weight.

5. A hydraulic composition according to claim 3 wherein the lignin amine has 2 alkyl amine groups having up to 4 carbon atoms and 2 sodium atoms in the lignin molecule per 1000 molecular weight.

6. A hydraulic cement according to claim 2 wherein the cement is API Class A cement.

7. A hydraulic cement composition according to claim 2 wherein the cement is API Class E cement.

References Cited by the Examiner

UNITED STATES PATENTS

| | | | |
|---|---|---|---|
| 1,491,427 | 4/1924 | Smit | 166—21 |
| 2,483,806 | 10/1949 | Buckley et al. | 260—17 |
| 2,588,248 | 3/1952 | Klein | 106—94 |
| 2,865,876 | 12/1958 | Scott | 260—29 |

WILLIAM H. SHORT, *Primary Examiner.*

MILTON STERMAN, LEON J. BERCOVITZ,
*Examiners.*